3,309,603
VOLTAGE TO PULSE FREQUENCY CONVERTER
Victor H. Seliger, North Caldwell, and Ronald Y. Paradise, Hillsdale, N.J., assignors to General Precision Inc., Little Falls, N.J., a corporation of Delaware
Filed Aug. 26, 1963, Ser. No. 304,415
5 Claims. (Cl. 321—60)

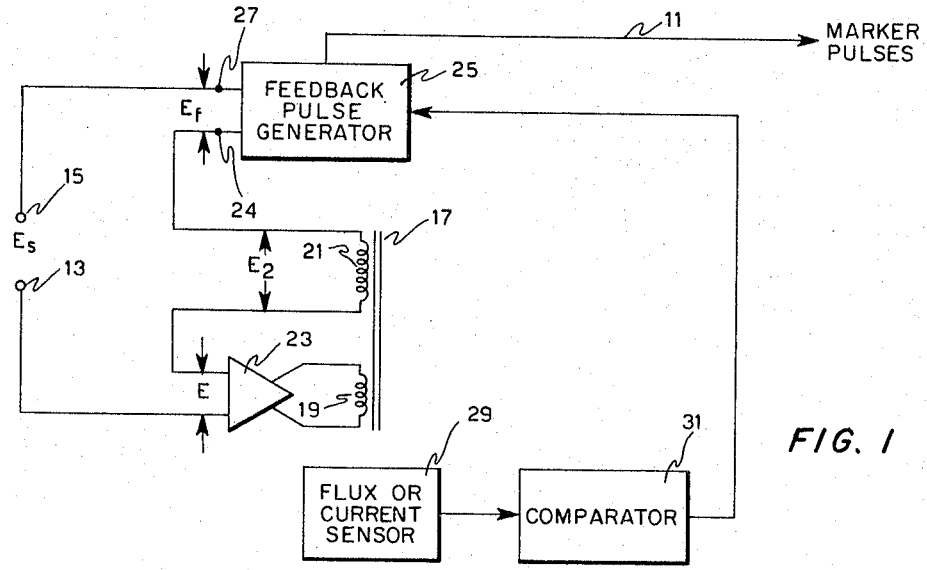
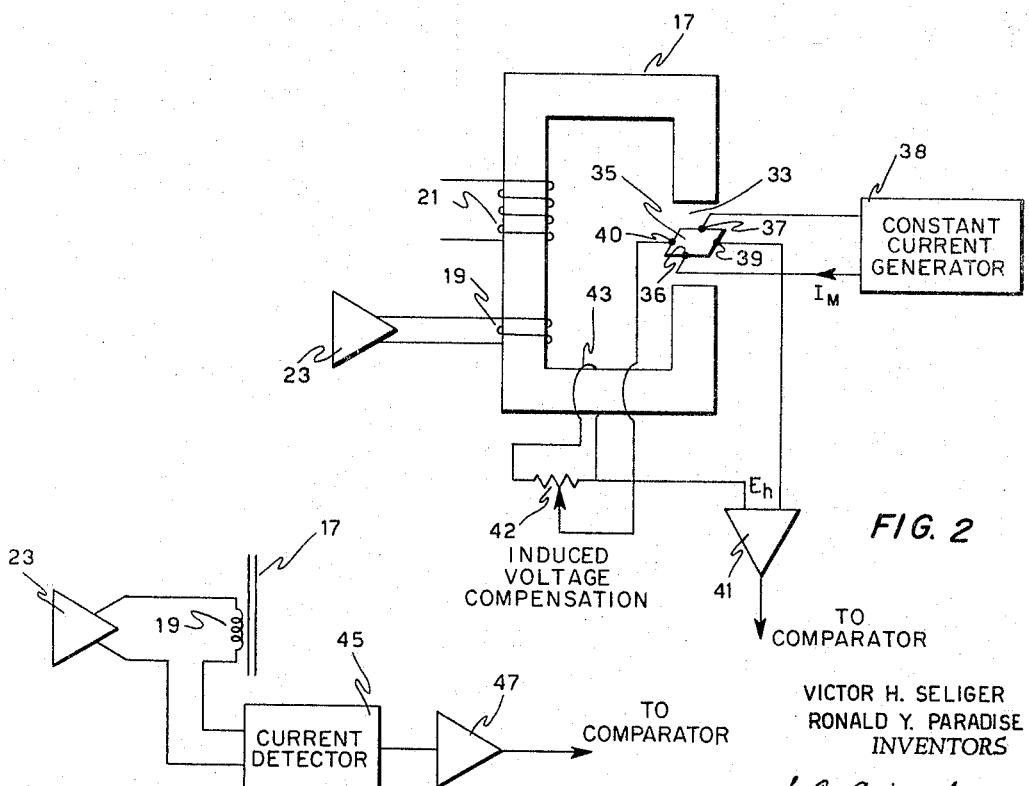
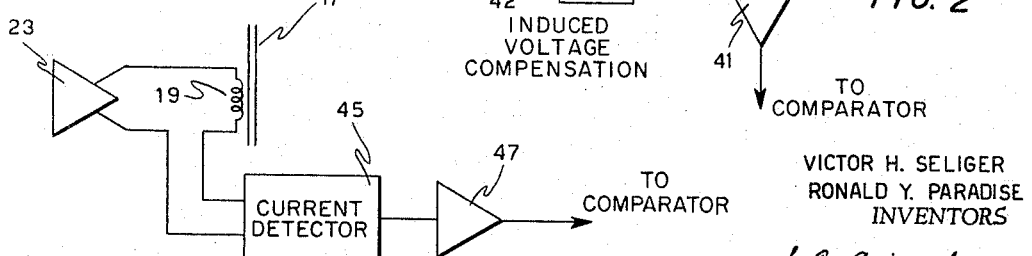
FIG. 1
FIG. 2
FIG. 3
VICTOR H. SELIGER
RONALD Y. PARADISE
INVENTORS

# United States Patent Office 3,309,603
Patented Mar. 14, 1967

This invention relates to systems for converting the amplitude of an applied signal voltage into the frequency of an output pulse train and more particularly to such a system in which the output pulse frequency bears a highly linear relationship to the applied signal voltage.

Voltage to pulse frequency converters are often used in electronic integrators as the number of output pulses produced from such a converter represents the integral of the signal voltage applied to the converter. Most of the voltage to pulse frequency converters of the prior art are unsatisfactory because they do not have a highly linear relationship between the output pulse frequency and the applied signal voltage. Because of this lack of linearity the accuracy of the integral computed by counting the output pulses from such a converter suffers. One converter of the prior art disclosed in an article entitled "Analog R–C Integrator With Digital Output," which appeared in the March 1961 issue of Electromechanical Design, is highly linear, but the accuracy of this converter is limited by leakage of an integrating capacitor used in the system. The system of the present invention does not make use of an integrating capacitor so it does not suffer from this disadvantage.

Accordingly a principal object of the present invention is to provide an improved voltage to pulse frequency converter;

Another object of the present invention is to provide a voltage to pulse frequency converter in which the pulse frequency output bears a highly linear relationship to the input signal voltage;

A further object of the invention is to provide a small, lightweight, relatively simple voltage to pulse frequency converter which is highly linear;

Further objects and advantages of the present invention will become readily apparent as the following detailed description of the invention unfolds and when taken in conjunction with the drawings wherein:

FIG. 1 is a block diagram illustrating the system of the present invention;

FIG. 2 illustrates part of the system of FIG. 1 in more detail in accordance with one embodiment of the invention; and FIG. 3 illustrates part of the system of FIG. 1 in more detail in accordance with another embodiment of the invention.

The system of the present invention illustrated in FIG. 1 functions to produce pulses from an output 11 at a frequency proportional to the signal voltage applied between input terminals 13 and 15. The system comprises a magnetically permeable member 17 having coils 19 and 21 wound thereon so that the members 19 and 21 are linked by a common flux path. The terminal 13 is connected to one side of the input of a signal voltage to current transducer 23 having a high amplification factor. The coil 21 is connected between the other side of the input of the transducer 23 and one output terminal 24 of a pulse generator 25. The other output terminal 27 of the pulse generator 25 is connected to the terminal 15. The pulse generator 25 produces a single output pulse of a constant impulse content between its output terminals 27 and 24 in response to an applied enabling signal. The polarity of the pulse produced depends upon the polarity of the applied enabling signal. Each time the pulse generator 25 produces an output pulse between terminals 24 and 27, it also applies a pulse of the same polarity to the output 11 of the system. It will be noted that the input signal applied between terminals 13 and 15, the output of the pulse generator 25, and the coil 21 are connected in series across the input of the transducer 23 so that the signal applied to the input of the transducer 23 will be the algebraic sum of the input signal applied between input terminals 13 and 15, the output from the pulse generator 25 produced between terminals 24 and 27, and the voltage induced in the coil 21. The output of the transducer 23 is connected across the coil 19 and will cause current to flow in the coil 19 proportional to the signal voltage applied across its input. A sensor 29 generates an output signal proportional to the amount of flux in the member 17 linking the coils 19 and 21 and having a polarity corresponding to the direction of the flux in the member 17. This signal is applied to a comparator 31 which will apply an enabling signal to the pulse generator 25 of one polarity whenever the output signal of the sensor 29 exceeds a positive threshold and will apply an enabling signal to the pulse generator 25 of the opposite polarity whenever the output signal of the sensor 29 exceeds a negative threshold of the same magnitude as the positive threshold. Accordingly the comparator 31 will apply an enabling signal to the pulse generator 25 and the pulse generator will produce an output pulse whenever the magnitude of flux in the member 17 exceeds a threshold value and the polarity of the enabling signal produced by the comparator 31 and therefore the polarity of the resulting output pulse from the pulse generator 25 will correspond to the direction of flux in the member 17. The amount of flux produced in the member 17 will be proportional to the current flowing in the coil 19 and hence to the signal voltage applied across the input of the transducer 23. As pointed out above this signal voltage comprises the algebraic sum of the input signal voltage, the output of the pulse generator 25, and the voltage induced in the coil 21. The polarity of each pulse produced by the pulse generator 25 relative to the flux in the member 17 will be such as to induce flux in the member 17 in the opposite direction. The output pulses of the pulse generator 25 reduce the voltage applied across the input of the transducer 23 and hence the magnitude of the flux in the member 17.

Since the coil 21 links the flux in the member 17, the voltage induced in the coil 21 is proportional to the rate of change of flux in the member 17, and hence to the rate of change of voltage applied across the input of the transducer 23. The polarity of connection of the coil 21 to terminal 24 and transducer 23 is such that the voltage induced in the coil 21 tends to oppose the direction of change of voltage applied across the input of transducer 23. The net result of the action of the coil 21 in conjunction with the member 17, coil 19, and transducer 23 is to cause the voltage across the input of transducer 23 to vary approximately in proportion to the time integral of the voltage between terminal 24 and terminal 13. Furthermore, the gain of transducer 23 is made sufficiently high that the voltage at the input to the transducer remains low, near zero, for an appreciable portion of time.

Whenever as a result of the above action, the voltage at the input to transducer 23 becomes different from zero by a certain critical amount, the magnitude of flux in the member 17 exceeds the previously described threshold, and a pulse is produced by pulse generator 25, as previously described, of the proper polarity to reduce the flux in member 17, and hence the voltage at the input to transducer 23.

Since the cooperative action of the elements described is such as to keep the voltage at the input to transducer 23 near zero at all times, the algebraic sum of the input signal voltage between terminal 15 and terminal 13, the pulse generator output between terminals 24 and 27, and the voltage across coil 21 is approximately zero at all times. With the polarities arranged as previously described, the voltage difference between the input signal and pulse generator output is therefore approximately proportional to the rate of change of flux in element 17; as a result, the total flux in element 17 at any time is approximately proportional to the difference between the time integral of the signal voltage and the time integral of the pulse generator output. Since the flux in element 17 is limited by the cooperative action of the elements described above to relatively small values, this difference is small; hence the time integral of the output of the pulse generator 25 equals approximately the time integral of the signal voltage between terminals 15 and 13. Since pulses produced by the pulse generator 25 have a constant impulse content, the pulse frequency of the pulse generator output will be proportional to the signal voltage applied across the input terminals 13 and 15.

For purposes of a mathematical description of the operation of the system of the invention the signal voltage applied between terminals 15 and 13 is designated $E_s$, the signal voltage produced at the output of the pulse generator 25 between terminals 27 and 24 is designated $E_f$, the signal voltage induced in the coil 21 is designated $E_2$, and the signal voltage applied across the input of the transducer 23 is designated $E$. In the system the input impedance of the transducer 23 will be very high and can be assumed to be infinite. Accordingly the following expression will be true.

(1) $$E(t) = E_s(t) - E_f(t) - E_2$$

If $\varphi$ designates the flux linking winding 21 the following expression can be written for $E_2$:

(2) $$E_2 = N\frac{d\varphi}{dt}$$

As pointed out above, the signal voltage applied across the input of the transducer 23 is maintained near zero because of the high amplification factor of the transducer 23. As a result the following expression can be written from Equations 1 and 2:

(3) $$0 \approx E_s(t) - E_f(t) - N\frac{d\varphi}{dt}$$

from which the following is obtained:

(4) $$E_s(t) - E_f(t) \approx N\frac{d\varphi}{dt}$$

Integrating both sides of the Equation 4 the following expression is obtained:

(5) $$\int_{t_1}^{t_2} E_s(t)dt - \int_{t_1}^{t_2} E_f(t)dt \approx N\Delta\varphi$$

in which (6) $$\Delta\varphi = \int_{t_1}^{t_2}\frac{d\varphi}{dt}dt = \int_{\varphi_1}^{\varphi_2}d\varphi$$

Over a significant time interval $\Delta\varphi$ will be small due to the action of the feedback generator 25 operating to keep the magnitude of the flux in the member 17 from substantially exceeding the threshold value. Accordingly the quantity $N\Delta\varphi$ is negligible with relation to the other terms of the Equation 5. Therefore the following expression is true:

(7) $$\int_{t_1}^{t_2} E_s(t) \approx \int_{t_1}^{t_2} E_f(t)dt$$

Hence the integral of $E_s$ over a given time interval is approximately equal to the integral of the output of the pulse generator 25 over such time interval. Since the impulse content of the output pulses of the pulse generator 25 is constant, the total number of pulses produced by the pulse generator 25 during the time interval will be proportional to the integral of the input signal $E_s$ and the average pulse frequency output produced at output 11 will be proportional to $E_s$.

FIG. 2 illustrates more specifically how the sensor 29 generates a signal proportional to the amount of flux in the member 17. As shown in FIG. 2 the member 17 is formed into a magnetic ring formed with an air gap 33. A Hall effect generator comprising semiconductor crystal 35 is positioned in the air gap 33 so that the lines of flux in the member 17 pass through the air gap and through the semiconductor crystal 35. Constant current is caused to flow through the semiconductor crystal 35 between a pair of input terminals 36 and 37 from a constant current generator 38. The input terminals 36 and 37 are positioned so that the constant current flows in a direction perpendicular to the direction of flux passing through the crystal 35. A pair of output terminals 39 and 40 are provided on the crystal 35 on an axis perpendicular to the direction of current flow through the crystal 35 and perpendicular to the lines of flux passing through the crystal 35. A signal voltage proportional to the flux passing through the crystal 35 will be produced at output terminals 39 and 40 by the Hall effect. The output terminal 39 is connected to one side of the input of an amplifier 41. The terminal 40 is connected to the movable arm of the potentiometer 42, the resistance of which is connected across a coil 43 having a single turn. One side of the resistance of the potentiometer 42 is connected to the opposite side of the input of the amplifier 41 to which the terminal 39 is connected. The coil 43 will produce a signal voltage proportional to the rate of change of flux in the magnetically permeable member 17 and this signal voltage is applied across the resistance of the potentiometer 42. A portion of this signal selected by the position of the movable arm of the potentiometer 42 is connected in series with the output signal from the terminals 39 and 40 and applied across the input of the amplifier 41. The signal voltage from the potentiometer 42 compensates for the signal voltage induced in the output circuit of the crystal 35 by changes of flux in the magnetically permeable member 17 so that the signal voltage applied across the input of the amplifier 41 will precisely equal at all times the amount of flux in the magnetically permeable member 17. The amplifier 41 amplifies the applied signal and applies it to the comparator 31.

Instead of using the Hall effect to detect the amount of flux in the magnetically permeable member 17, the amount of flux can be determined from the current flowing in the coil 19, as the flux in the member 17 will be directly proportional to the current flowing in the coil 19. FIG. 3 illustrates a system in which the sensor 29 generates a signal in response to the current flow in the coil 19 instead of directly in response to the amount of flux in the member 17 as is done in the embodiment illustrated in FIG. 2. As shown in FIG. 3 the coil 19 is connected in series with a current detector 45 across the output of the transducer 23 so that the current flowing through the coil 19 also flows through the current detector 45. The current detector 45 produces an output signal voltage proportional to the current flowing therethrough, which signal is amplified by an amplifier 47 and applied to the comparator 31. Thus the signal applied to the comparator 31 will be proportional to the flux in the member 17.

Thus there is provided a relatively simple highly linear system for producing an output pulse train having a pulse frequency proportional to an applied input signal voltage. The above description is of specific embodiments of the invention and many modifications may be made thereto without departing from the spirit and scope of the invention, which is defined in the appended claims.

What is claimed is:

1. A voltage to pulse frequency converter comprising means defining a flux path, transducer means to cause flux to flow in said flux path having a magnitude proportional to an applied signal, a coil surrounding said flux path, a pulse generator operable to produce an output pulse in response to an applied enabling signal, a pair of input terminals, circuit means connecting said input terminals, the output of said pulse generator, and said coil in series across the input of said transducer means, and sensor means to apply an enabling signal to said pulse generating means whenever the flux in said flux path exceeds a predetermined value.

2. A converter as recited in claim 1 wherein said sensor means comprises a Hall effect generator to produce an output signal proportional to the flux in said flux path, and means to apply in an enabling signal to said pulse generator whenever the output signal of said Hall effect generator exceeds a predetermined value.

3. A converter as recited in claim 1 wherein said transducer means comprises a second coil surrounding said flux path and means to cause current to flow through said second coil proportional to the signal voltage applied across the input of said transducer means and wherein said sensor means comprises a current detector means responsive to the current flowing in said second coil to produce an output signal proportional thereto and thereby proportional to the flux in said flux path, and means to apply an enabling signal to said pulse generator whenever the output signal of said current detector means exceeds a predetermined value.

4. A voltage to pulse frequency converter comprising transducer means to generate an output current proportional to an applied signal voltage, inductor means coupled to said transducer means to generate a signal proportional to the rate of change of current flow produced by said transducer means, a pulse generator operable to produce an output pulse in response to an applied enabling signal, input means to receive an input signal, circuit means for applying to said transducer means a signal proportional to said input signal minus the output of said pulse generator minus the output of said inductor means, and means responsive to the output current of said transducer means exceeding a predetermined value to apply an enabling signal to said pulse generator.

5. A voltage-to-pulse-frequency converter comprising:
means defining a flux path,
transducer means inductively coupled to said flux-path-defining means to cause flux to flow in said flux path having a magnitude proportional to an applied signal;
an inductor coupled to said flux path;
a pulse generator operable to produce an output pulse in response to an applied enabling signal;
a pair of input terminals;
circuit means connecting said input terminals, the output of said pulse generator and said inductor in series across the input of said transducer means with respective relative polarities such that said applied signal to the transducer means will be the algebraic sum of the input signal between said input terminals, the output of the pulse generator, and the voltage induced in said inductor; and
sensor means to apply an enabling signal to said pulse generating means whenever the flux in said flux path exceeds a predetermined value.

References Cited by the Examiner

UNITED STATES PATENTS

| | | | |
|---|---|---|---|
| 3,012,183 | 12/1961 | Robinson | 321—69 |
| 3,064,208 | 11/1962 | Bullock et al. | 332—9 |
| 3,139,595 | 6/1964 | Barber | 331—114 |

JOHN F. COUCH, *Primary Examiner.*

G. GOLDBERG, *Assistant Examiner.*